(12) United States Patent
Padsalgikar

(10) Patent No.: US 9,216,558 B2
(45) Date of Patent: Dec. 22, 2015

(54) BONDING PROCESS

(75) Inventor: Ajay D. Padsalgikar, Plymouth, MN (US)

(73) Assignee: Aortech International plc, Glasgow (GB)

( * ) Notice: Subject to any disclaimer, the term of this patent is extended or adjusted under 35 U.S.C. 154(b) by 123 days.

(21) Appl. No.: 14/113,640

(22) PCT Filed: Apr. 26, 2012

(86) PCT No.: PCT/US2012/035241
§ 371 (c)(1),
(2), (4) Date: Feb. 5, 2014

(87) PCT Pub. No.: WO2012/149179
PCT Pub. Date: Nov. 1, 2012

(65) Prior Publication Data
US 2014/0141256 A1 May 22, 2014

Related U.S. Application Data

(60) Provisional application No. 61/479,038, filed on Apr. 26, 2011.

(51) Int. Cl.
| | |
|---|---|
| *B32B 27/28* | (2006.01) |
| *B32B 27/40* | (2006.01) |
| *B32B 37/06* | (2006.01) |
| *B32B 27/08* | (2006.01) |
| *B29C 59/08* | (2006.01) |
| *C08G 77/16* | (2006.01) |
| *C08J 7/04* | (2006.01) |
| *C09J 5/02* | (2006.01) |
| *C08J 5/12* | (2006.01) |
| *B29C 65/48* | (2006.01) |
| *B29C 65/00* | (2006.01) |

(52) U.S. Cl.
CPC .................. *B32B 27/08* (2013.01); *B29C 59/08* (2013.01); *B32B 27/28* (2013.01); *B32B 27/40* (2013.01); *B32B 37/06* (2013.01); *C08G 77/16* (2013.01); *C08J 5/121* (2013.01); *C08J 7/04* (2013.01); *C09J 5/02* (2013.01); *B29C 65/4895* (2013.01); *B29C 66/028* (2013.01); *B29C 66/71* (2013.01); *C08J 2375/04* (2013.01); *C08J 2383/04* (2013.01); *C09J 2475/006* (2013.01); *C09J 2483/006* (2013.01); *C09J 2483/008* (2013.01); *Y10T 428/31598* (2015.04)

(58) Field of Classification Search
CPC ........ B32B 27/08; B32B 27/28; B32B 27/40; B32B 37/06; Y10T 428/31598; B29C 59/08; B29C 66/028; B29C 66/71; B29C 65/4895; C08G 77/16; C09J 5/02; C09J 2483/008; C09J 2475/006; B29K 2075/00; B29K 2083/00; C08J 2375/04; C08J 2383/04; C08J 5/121; C08J 7/04
USPC ......................................... 428/425.5; 156/82
See application file for complete search history.

(56) References Cited

U.S. PATENT DOCUMENTS

| | | | |
|---|---|---|---|
| 4,098,856 A | 7/1978 | Rosenau | |
| 5,032,666 A * | 7/1991 | Hu et al. | ........................ 528/70 |
| 2006/0222868 A1* | 10/2006 | Mori | ............................ 428/447 |
| 2007/0027285 A1* | 2/2007 | Gunatillake et al. | ............. 528/28 |
| 2010/0255317 A1 | 10/2010 | Saito et al. | |
| 2011/0072685 A1 | 3/2011 | Gutowsky, Jr. et al. | |

FOREIGN PATENT DOCUMENTS

| | | |
|---|---|---|
| NO | WO-00/64971 A1 | 11/2000 |
| WO | WO-92/00338 A1 | 1/1992 |
| WO | WO-98/13405 A1 | 4/1998 |
| WO | WO-98/54242 A1 | 12/1998 |
| WO | WO-99/03863 A1 | 1/1999 |
| WO | WO-99/50327 A1 | 10/1999 |
| WO | WO-00/00355 A1 | 1/2000 |
| WO | WO-2007112485 A1 | 10/2007 |
| WO | WO-2012149179 A1 | 11/2012 |

OTHER PUBLICATIONS

"European Application Serial No. 12776978.4, Supplementary European Search Report mailed Nov. 11, 2014", 5 pgs.
"International Application Serial No. PCT/US2012/035241, International Preliminary Report on Patentability mailed Nov. 7, 2013", 6 pgs.
"International Application Serial No. PCT/US2012/035241, Search Report mailed Sep. 18, 2012", 4 pgs.
"International Application Serial No. PCT/US2012/035241, Written Opinion mailed Sep. 18, 2012", 4 pgs.
Farris, Stefano, et al., "The Fundamentals of Flame Treatment for the Surface Activation of Polyolefin Polymers", A Review, (2010), 15 pgs.
European Application Serial No. 12776978.4, Response filed May 19, 2015 to Office Action mailed Nov. 28, 2014, 7 pgs.

* cited by examiner

*Primary Examiner* — Thao T Tran
(74) *Attorney, Agent, or Firm* — Schwegman Lundberg & Woessner, P.A.

(57) ABSTRACT

The invention relates to a process for bonding a silicone or silicone based material to a polyurethane and use of the bonded silicone-polyurethane in the manufacture of biomaterials, devices, articles or implants, in particular long term implantable medical devices in the fields of cardiology, orthopaedics, plastic surgery and gastroenterology. The process involves the steps of (a) flame treating a surface of the silicone or silicone based material and (b) bonding the polyurethane to the flame treated surface of the silicone or silicone based material.

12 Claims, No Drawings

BONDING PROCESS

CROSS-REFERENCE TO RELATED APPLICATIONS

This application is a U.S. National Stage Application filed under 35 U.S.C. §371of International Application Ser. No. PCT/US2012/035241, filed Apr. 26, 2012, and published on Nov. 1, 2012 as WO 2012/149179, which claims priority of U.S. provisional application No. 61/479,038, filed Apr. 26, 2011, both of which applications and publication are herein incorporated by reference in their entireties.

FIELD OF THE INVENTION

The invention relates to a process for bonding a silicone or silicone based material to a polyurethane and use of the bonded silicone-polyurethane in the manufacture of biomaterials, devices, articles or implants, in particular long term implantable medical devices in the fields of cardiology, orthopaedics, plastic surgery and gastroenterology.

BACKGROUND OF THE INVENTION

Silicone medical device components have the advantages of high flexibility and biostability. However, they also possess the disadvantage of being relatively weak in their mechanical properties such as tensile strength and abrasion resistance. Frequently a surface layer of a high abrasion resistant material is required above a substrate of a silicone device. Polyurethanes offer that high abrasion resistance and other good mechanical properties.

However, some of the properties of polyurethanes make the combination of silicone and polyurethane components difficult.

Most commercial polyurethanes are not biostable and tend to break down under in-vivo conditions in long term implantation.

Biostable polyurethanes are disclosed in WO92/00338, WO98/013405, WO98/54242, WO99/003863, WO99/050327, WO00/64971 and WO2007/112485 including ELAST-EON 2 (AORTECH BIOMATERIALS, Victoria, Australia) which is a polyurethane having a soft segment based on 80 wt % of a hydroxyl terminated polydimethylsiloxane (PDMS) and 20 wt % of a polyether polyol specifically polyhexamethylene oxide (PHMO). These polymers are stable under in-vice conditions and can been used for many long term implantable applications.

Bonding of silicone based components to polyurethane based components has been tried using several methods. Treating the surface of silicone with a primer, use of glues and plasma treatments nave been employed and these methods deliver a bond as with certain degree of adhesiveness. However, in many applications the bond has proven to be inadequate. The bonding of most materials to silicone is a challenge due to the low surface energy of silicone. In fact silicone sprays are used in mould releases and moulds can be constructed from silicones to provide good release of mouldings.

SUMMARY OF THE INVENTION

We have now found that altering the surface of the silicone can lead to significant changes in the adhesive properties of the silicone.

In one aspect, there is provided a process for bonding a silicone or a silicone based material to a polyurethane which comprises the steps of:

(a) flame treating a surface of the silicone or silicone based material; and
(b) bonding the polyurethane to the flame treated surface of the silicone or silicone based material.

In another aspect, there is provided a silicone or a silicone based material when bonded to a polyurethane by the process defined above.

In a further aspect, there is provided a biomaterial, device, article or implant which is wholly or partly composed of the silicone or a silicone based material when bonded to a polyurethane by the process defined above.

DETAILED DESCRIPTION OF THE INVENTION

The process of the present invention involves flame treating a surface oil a silicone or silicone based material and bonding a polyurethane to the flame treated surface of the silicone. While not wishing to be bound by any theory, it is believed that this high temperature flame treatment leads to the formation of oxides on the surface of the silicone and these oxides react with the isocyanate and NCO groups on the polyurethane.

Silicone or Silicone-Based Material

The term "silicone" as used herein refers to silicone or silicone based solids of varying hardness including elastomers, rubbers and resins. The hardness may be in the range of 10 to 90 Shore A. These polymers include silicons together with carbon, hydrogen and oxygen. Silicones are also known as polymerised siloxanes or polysiloxanes composed of units having the formula $(R)_2SiO$ in which R is an organic side chain which is not hydrogen. Representative examples are $[Si(CH_3)_2O]_n$ (polydimethylsiloxane) and $[Si(C_6H_5)_2O]_n$ (polydiphenylsiloxane) in which n is an integer of 1 or greater. The compounds can be viewed as a hybrid or both organic and inorganic compounds. The organic side chains confer hydrophobic properties while the —Si—O—Si—O— backbone is purely inorganic. Examples of silicones or silicone-based materials include silicone rubber, coatings, encapsulants and sealants.

Polyurethane

The polyurethane is preferably biostable far use as a biomaterial in medical devices, articles or implants. Suitable biostable polyurethanes include polyurethanes, polyurethane ureas or polycarbonates containing silicon. Examples of silicon-containing polyurethanes, polyurethane ureas or polycarbonates include those disclosed in WO92/00338, WO98/13405, WO98/54242, WO99/03863, WO99/50327, WO00/64971 and WO2007/112485, the entire contents of winch are incorporated herein by reference. The polyurethanes, polyurethane ureas or polycarbonates generally contain a soft segment and a hard segment. The segments can be combined as copolymers or as blends. For example, polyurethanes with soft segments such as PTMO, polyethylene oxide, polypropylene oxide, polycarbonate, polyolefin, polysiloxane (for example polydimethylsiloxane) and other polyether soft segments made from higher homologous series of diols may be used. Mixtures of any of the soft segments may also be used. The soft segments also may have either alcohol end groups or amine end groups. The molecular weight of the soft segments may vary from about 500 to about 6000. it will be understood that the molecular weight values referred to herein are "number average molecular weights".

Suitable polyether diol and diamine soft segments include those represented by the formula (I)

$$A\text{-}[(CH_2)_m\text{—}X]_n A' \tag{I}$$

in which

A is OH or NHR, X is O or NR and A' is H wherein R is H or optionally substituted $C_{1-6}$ alkyl, more preferably optionally substituted $C_{1-4}$ alkyl;

m is an integer of 4 or more, preferably 4 to 18; and n is an integer of 2 to 50.

Preferably polyether diol soft segments include those represented by formula (I) wherein A is OH and A' is H.

Polyether diols of formula (I) wherein m is 4 to 10 such as polytetramethylene Oxide (PTMO), polyhexamethylene oxide (PHMO), polyheptamethylene oxide, polyoctamethylene oxide (POMO) and polydecamethylene oxide (PDMO) are preferred. PHMO is particularly preferred.

The preferred molecular weight range of the polyether is 200 to 5000, more preferably 200 to 2000.

Suitable polycarbonate diols include poly(alkylene carbonates) such as poly(hexamethylene carbonate) and poly(decamethylene carbonate): polycarbonates prepared by reacting alkylene carbonate with alkanediols for example 1,4-butanediol, 1,10-decanediol (DD), 1,6-hexanediol (HD) and/or 2,2-diethyl 1,3-propanediol (DEPD); and silicon based polycarbonates prepared by reacting alkylene carbonate with 1,3-bis(4-hydroxybutyl)-1,1,3,3-tetramethyldisiloxane (BRIT) and/or alkanediols.

It will be appreciated when both the polyether and polycarbonate macrodiols are so present, they may be in the form of a mixture or a copolymer, An example of a suitable copolymer is a copoly(ether carbonate) macrodiol represented by the formula (II)

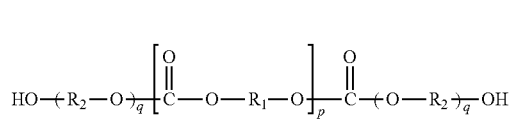

(II)

in which $R_1$ and $R_2$ are the same or different arid selected from an optionally substituted $C_{1-6}$ alkylene, $C_{2-6}$ alkenylene, $C_{2-6}$ alkynylene, arylene or a heterocyclic divalent radical; and p and q are integers of 1 to 20.

Although the compound of formula (II) above indicates blocks of carbonate and ether groups, it will be understood that they also could be distributed randomly in the main structure.

Suitable polysiloxane diols or diamines are represented by the formula (III):

(III)

in which

A and A' are OH or NHR wherein R is H or optionally substituted $C_{1-6}$ alkyl more preferably optionally substituted $C_{1-4}$ alkyl;

$R_{11}$, $R_{12}$, $R_{13}$ and $R_{14}$ are independently selected from hydrogen or optionally substituted $C_{1-6}$ alkyl;

$R_{15}$ and $R_{16}$ are the same or different and selected from optionally substituted $C_{1-6}$ alkylene, $C_{2-6}$ alkenylene, $C_{12-6}$ alkynylene, arylene or a heterocyclic divalent radical; and p is an integer of 1 or greater.

A preferred polysiloxane is a hydroxyl terminated PDMS which is a compound of formula (III) in which A and A' are hydroxyl, $R_{11}$ to $R_{14}$ are methyl and $R_{15}$ and $R_{16}$ are as defined above. Preferably $R_{15}$ and $R_{16}$ are the same or different and selected from propylene, butylene, pentylene, hexylene, ethoxypropyl ($-CH_2CH_2OCH_2CH_2CH_2-$), propoxypropyl and butoxypropyl, more preferably ethoxypropyl. A particularly preferred polysiloxane is Shin Etsu product X-22-160AS having a molecular weight of 947.12 which is α-ω-bis(hydroxyethoxypropyl)polydimethylsiloxane.

Other silicon-containing diols of the formula (III) are 1,3-bis(4-hydroxybutyl)tetramethyl disiloxane (BHTD) (compound of formula (III) in which A and A' are OH, $R_{11}$, $R_{12}$, $R_{13}$ and $R_{14}$ are methyl, $R_{15}$ and $R_{16}$ are butyl and p is 1), 1,4-bis(3-hydroxypropyl)tetramethyl disilylethylene (compound of formula (III) in which A and A' are OH, $R_1$, $R_{12}$, $R_{13}$ and $R_{14}$ are methyl, $R_{15}$ and $R_{16}$ are propyl, p is 1 and O is replaced by ethylene) and 1-4-bis(3-hydroxypropyl)tetramethyl disiloxane, more preferably BHTD.

The polysiloxanes may be obtained as commercially available products such as X-22-160AS from Shin Etsu in Japan or prepared according. to known procedures. The preferred molecular weight range of the polysiloxane macrodiol is 200 to 6000, more preferably from 200 to 5000.

Other preferred polysiloxanes are polysiloxane macrodiamines which are polymers of the formula (III) wherein A is $NH_2$, such as, for example, amino-terminated PDMS.

Suitable silicon-containing polycarbonates have the formula (IV):

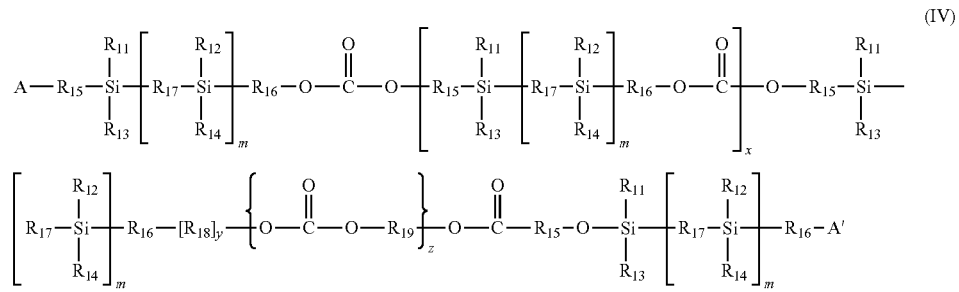

(IV)

in which $R_{11}$, $R_{12}$, $R_{13}$, $R_{14}$, and $R_{15}$ are as defined in formula (III) above;

$R_{16}$ is an optionally substituted $C_{1-6}$ alkylene, $C_{2-6}$ alkenylene, $C_{2-6}$ alkynylene, arylene or a heterocyclic divalent radical;

$R_{17}$ is a divalent linking group, preferably O, S or $NR_{18}$;

$R_{18}$ and $R_{19}$ are same or different and selected from optionally substituted $C_{1-6}$ alkyl;

A and A' are as defined in formula (III) above;

m, y and z are integers of 0 or more; and x is an integer of 0 or more.

Preferably z is an integer of 0 to 50 and x is an integer of 1 to 50. Suitable values for m include 0 to 20, more preferably 0 to 10. Preferred values for y are 0 to 10, more preferably 0 to 2.

A preferred silicon-containing polycarbonate is a compound of the formula (IV) in which A and A' are hydroxyl.

Particularly preferred silicon-containing polycarbonate diols are compounds of the formula (IV) in which A and A' are hydroxyl, $R_{11}$, $R_{12}$, $R_{13}$ and $R_{14}$ are methyl, $R_{18}$ is ethyl, $R_{19}$ is hexyl, $R_{15}$ and $R_{16}$ are propyl or $R_{14}$ butyl and $R_{17}$ is O or —$CH_2$—$CH_2$—, more preferably $R_{15}$ and $R_{16}$ are propyl when $R_{17}$ is O and $R_{15}$ and $R_{16}$ are butyl when $R_{17}$ is —$CH_2$—$CH_2$—. The preferred molecular weight range of the silicon-based polycarbonate macrodiol is from 400 to 5000, more preferably from 400 to 2000.

Preferably, the hard segment is formed from a diisocyanate and a chain extender.

The diisocyanate may be represented by the formula OCN—R—NCO, where —R— may be aliphatic, aromatic, cycloaliphatic or a mixture of aliphatic and aromatic moieties. Examples of diisocyanates include 4,4'-diphenylmethane diisocyanate (MDI), methylene biscyclohexyl diisocyanate ($H_{12}$ MDI), tetramethylene diisocyanate, hexamethylene diisocyanate, trimethyhexamethylene diisocyanate, tetramethylxylylene diisocyanate such as p-tetramethylxylene diisocyanate(p-TMXDI) or m-tetramethylxylene-diisocyanate (m-TMXDI), 4,4'-dicyclohexylmethane diisocyanate, dimer acid diisocyanate, isophorone diisocyanate (IPDI), metaxylene diisocyanate, diethylbenzene diisocyanate, decamethylene 1,10 diisocyanate, cyclohexylene 1,2-diisocyanate, trans-cyclohexylene-1,4-diisocyanate (CHDI). 2,4-toluene diisocyanate (2,4-TDI), 2,6-toluene diisocyanate, xylene diisocyanate, p-phenylene diisocyanate (p-PDI), m-phenylene diisocyanate (m-PDI), hexahydotoylene diisocyanate (and isomers), naphthylene-1,5-diisocyanate (NDI), 1-methoxyphenyl 2,4-diisocyanate, 4,4'-biphenylene diisocyanate, 3,3'-dimethoxy-4,4'-biphenyl diisocyanate or 1,6-diisocyanatehexane (DICH), isomers or mixtures thereof. Preferably the diisocyanate is MDI.

The term "chain extender" in the present context means any chain extender which is capable of reacting with a diisocyanate group. The chain extender generally has a molecular weight range of 500 or less, preferably 15 to 500, more preferably 60 to 450 and may be selected from diol or diamine chain extenders.

Examples of diol chain extenders include $C_{1-12}$ alkane diols such as 1,4-butanediol (BDO), 1,6-hexanediol, 1,8-octanediol, 1,9-nonanediol, 1,10-decanediol and 1,12-dodecanediol; cyclic diols such as 1,4-cyclohexanediol, 1,4-cyclohexanedimethanol, 1,4-bis(2-hydroxyethoxy)benzene and p-xyleneglycol; and silicon-containing diols such as 1,3-bis(4-hydroxybutyl) tetramethyldisiloxane and 1,3-bis(6-hydroxyethoxypropyl) tetramethyldisiloxane. Preferably the diol chain extender is BDO.

The diol chain extender may also contain silicon. Suitable silicon-containing diol chain extenders include those of formula (V)

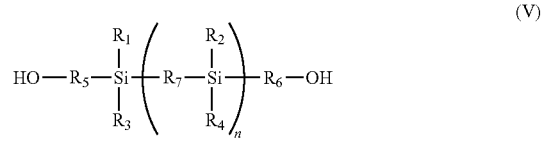

in which $R_1$, $R_2$, $R_3$ and $R_4$ are the same or different and selected from H and an optionally substituted $C_{1-6}$ alkyl;

$R_5$ and $R_6$ are the same of different and selected from optionally substituted $C_{1-6}$ alkylene, $C_{2-6}$ alkenylene, $C_{12-6}$ alkynylene, arylene and a heterocyclic divalent radical;

$R_7$ is a divalent linking group, preferably O; and n is 0 or greater, preferably 2 or less.

Suitable diamine chain extenders include $C_{1-12}$ alkane diamines such as 1,2-ethylenediamine, 1,3-propanediamine, 1,4-butanediamine and 1,6-hexanediamine; and silicon-containing diamines such as 1,3-bis(3-aminopropyl) tetramethyldisiloxane and 1,3-bis(4-aminobutyl)tetramethyldisiloxane.

The diamine chain extender may also contain silicon. Suitable silicon-containing diamine chain extenders include those of formula (VI)

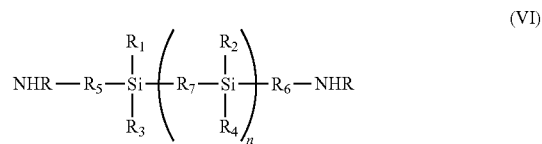

in which

R is hydrogen or an optionally substituted $C_{1-6}$ alkyl;

$R_1$, $R_2$, $R_3$ and $R_4$ are the same or different and selected from hydrogen and optionally substituted $C_{1-6}$ alkyl;

$R_5$ and $R_6$ are the same or different and selected from optionally substituted $C_{1-6}$ alkylene, $C_{2-6}$ alkenylene, $C_{12-6}$ alkynylene, arylene and a heterocyclic divalent radical;

$R_7$ is a divalent linking group, preferably O; and n is 0 or greater, preferably 2 or less.

Other applicable biostable polyurethanes include those using polyol as a component of the hard segment. Polyols may be aliphatic, aromatic, cycloaliphatic or may contain a mixture of aliphatic and aromatic moieties. For example, the polyol may be ethylene glycol, diethylene glycol, triethylene glycol, 1,4-butanediol, 1,6-hexanediol, 1,8-octanediol, propylene glycols, 2,3-butylene glycol, dipropylene glycol, dibutylene glycol, glycerol, or mixtures thereof. Polyurethanes modified with cationic, anionic and aliphatic side chains may also be used (see, for example, U.S. Pat. No. 5,017,464).

It will be appreciated that polyurethanes which are not biostable may also be used in the process of the present invention as they are intended to be bonded to silicone or silicone based materials which are biostable and are therefore still suitable for use in medical devices, articles or implants.

Examples of polyurethanes which are not biostable include polyester polyol based polyurethanes and also polyurethanes with limited biostability such as those based on polyether polyols.

The bonding process has been found to be particularly advantageous when the polyurethane is applied to the flame treated silicone surface in the form of a liquid such as in a solvent or as a reactive liquid. Suitable solvents include organic solvents such as dimethyl acetamide (DMAc), dimethyl formamide (DMF) and tetrahydrofuran (THE).

Flame Treatment

Any known flame treatment may be used to oxidise at least part of the surface or the silicone or silicone based material. The range of suitable, parameters for the flame treatment are as follows: the oxygen ratio (%) detectable after combustion from 0.05% to 5%, preferably from 0.2% to 2%; treatment speed from 0.1 m/min to 2000 m/min, preferably from 10 m/min to 100 m/min; treatment distance from 1 mm to 500 mm, preferably from 2 mm to 50 mm. Many gases are suitable for flame treatment including natural gases; pure combustible gases such as methane, ethane, propane and hydrogen; or a mixture of different combustible gases. The combustion mixture also includes air, pure oxygen or oxygen containing gases.

The surface of the silicone is preferably treated with a blue flame at temperatures in the range of 1550° C. to 3000° C. and the resultant surface has an excellent adhesion with the polyurethane. The flame treatment may be performed using any suitable known apparatus such as a burner based on natural gas such as propane, butane or methane. The flame treatment should be done with care and only for a short time such as 2 to 10 seconds as excessive and improper treatment can lead to burning of the silicone, The flame treatment may be repeated several times to ensure adequate bonding of the polyurethane. Once the polyurethane has been bonded to the silicone, then the bonded silicone-polyurethanes can be cured to further promote bonding if necessary.

Applications

The bonded silicone-polyurethanes of the present invention are particularly useful in preparing biomaterials and medical devices, articles or implants as a consequence of their biostability, acid resistance and abrasion resistance and mechanical properties including tensile modulus and creep resistance.

The term "biostable" refers to a stability when in contact with cells and/or bodily fluids of living animals or humans.

The term "biomaterial" refers to a material which is used in situations where it comes into contact with the cells and/or bodily fluids of living animals or humans.

The medical devices, articles or implants may include catheters; stylets: boric suture anchors; vascular, oesophageal and bilial stems; cochlear implants; as reconstructive facial surgery; controlled drug release devices; components in key hole surgery; biosensors; membranes for cell encapsulations; medical guidewires; medical guidepins; cannularizations; pacemakers, defibrillators and neurostimulators and their respective electrode leads; ventricular assist devices; orthopaedic joints or parts thereof including spinal discs and small joints; cranioplasty plates; intraoccular lenses; urological stents and other urological devices; stent/graft devices; device joining/extending/repair sleeves; heart valves; vein grafts; vascular access ports; vascular shunts; blood purification devices; casts for broken limbs; vein valve, angioplasty, electrophysiology and cardiac output catheters; plastic surgery implants such as breast implant shells; lapbands; gastric balloons; and tools and accessories for insertion of medical devices, infusion and flow control devices.

It will be appreciated that polyurethanes having properties optimised for use in the construction of various medical devices, articles or implants will also have other non-medical applications. Such applications may include toys and toy components, shape memory films, pipe couplings, electrical connectors, zero-insertion force connectors, Robotics, Aerospace actuators, dynamic displays, flow control devices, sporting goods and components thereof, body-conforming devices, temperature control devices, safety release devices and heat shrink insulation.

EXAMPLE

The invention will now be described with reference to the following non-limiting example.

An implantable orthopaedic device had a section coated with silicone. This section had to be overmoulded with Elast-Eon2 in order to prevent the abrasion of the bottom layer and thus the malfunctioning of the device.

A flame was lit on a propane gas based blow torch. The silicone portion was treated with the blue part of a flame. The treatment process was ~2 seconds a pass over the silicone portion and there were three passes in total. The flame was at a distance of ~5 mm from the device.

An Elast-Eon2 mixture was there prepared by mixing a pre-polymer containing α-ω-bis(hydroxyethoxypropyl) polydimethylsiloxane (Shin Esu product X-22-160AS, MW 947.12), polyhexamethyleneoxide (PHMO) and 4,4'-diphenylmethane diisocyanate (MDI) with 1,4-butane diol (BDO). As this mix was ready, it was drawn out in a syringe and injected over the treated silicone surface. The entire device was then placed in a mould and cured for an hour before demoulding. The device, after demoulding, was further cured for 10 hours in an oven with a temperature of 100° C.

All publications, patents and patent applications are incorporated herein by Reference. While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

The invention claimed is:

1. A process for manufacturing a long term implantable medical device comprising:
providing a substrate for the device of, or having a section coated with, a silicone or silicone based material;
flame treating a surface of the silicone or silicone based material; and
bonding a polyurethane or polyurethane urea to the flame treated surface of the silicone or silicone based material, the polyurethane or polyurethane urea being selected from biostable polyurethanes and polyurethane ureas comprising soft segments and hard segments, the soft segments having a number average molecular weight of about 500-6000 and being formed from a polysiloxane diol or diamine of the formula (III)

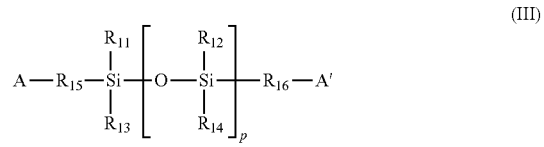

(III)

in which
A and A' are OH or NHR wherein R is H or $C_{1-6}$ alkyl;
$R_{11}$, $R_{12}$, $R_{13}$ and $R_{14}$ are independently selected from hydrogen or $C_{1-6}$ alkyl;

$R_{15}$ and $R_{16}$ are the same or different and selected from $C_{1-6}$ alkylene, $C_{2-6}$ alkenylene, $C_{12-6}$ alkynylene, arylene or a heterocyclic divalent radical;

p is an integer of 1 or greater; and a polyether diol or diamine represented by the formula (I)

$$A\text{-}[(CH_2)_m\text{---}X]_n A'  \qquad (I)$$

in which

A is OH or NHR, X is O or NR and A' is H wherein R is H or $C_{1-4}$ alkyl;

m is an integer of 4 to 18; and n is an integer of 2 to 50; and, optionally, a poly(alkylene) carbonate (II);

a copoly[ether carbonate] macrodiol, formed by copolymerizing (I) and (II) and/or a silicon-containing poly(alkylene) carbonate (IV) formed by copolymerizing compound (III) and compound (II); and the hard segment being formed from a ($C_1$-$C_{12}$) alkane diol or a ($C_1$-$C_{12}$) alkane diamine and a diisocyanate.

2. The process of claim 1, wherein the device is a catheter; stylet; bone suture anchor; vascular, oesophageal or bilial stent; cochlear implant; controlled drug release device; biosensor; medical guidewire; medical guidepin; cannularization; pacemaker, defibrillator or neurostimulator and their respective electrode leads; ventricular assist device; orthopaedic joint or parts thereof including a spinal disc and small joint; cranioplasty plate; intraocular lens; urological stent; stent/graft device; device joining/extending/repair sleeves; heart valve; vein graft; vascular access port; vascular shunt; blood purification device; vein valve, angioplasty, electrophysiology or cardiac output catheter; plastic surgery implant; breast implant shell; lap band; or gastric balloon.

3. The process of claim 1 or 2, wherein flame treating is by exposing the surface to a blue flame at a distance of 1 mm-500 mm for 2-10 seconds at 1550-3000° C.

4. The process of claim 1, wherein the polyurethanes or polyurethane ureas contain soft segments formed from the polysiloxane diol (III) and soft segments formed from a polyether diol (I) or poly(alkylene)carbonate diol (II).

5. The process of claim 4, wherein the soft segments are formed from α-ω-bis(hydroxyethoxypropyl)polydimethylsiloxane and from polyhexamethylene oxide.

6. The process of claim 1, wherein the diisocyanate is 4-4'-diphenylmethane diisocyanate.

7. The process of claim 6, wherein the hard segments comprise a ($C_1$-$C_{12}$)alkane diol.

8. The process of claim 1, wherein the polyurethane is applied to the flame treated silicone surface in a solvent or in the form of a reactive liquid.

9. The process of claim 8, wherein the polyurethane is applied to the flame treated silicone surface in dimethyl acetamide, dimethyl formamide or tetrahydrofuran.

10. The process of claim 1, wherein the substrate for the device comprising silicone or a silicone based material is placed in a mould, the polyurethane applied and is cured and the device is demoulded.

11. The process of claim 10, wherein after demoulding the device is further cured in an oven.

12. A long term implantable medical device made by the process of claim 1, wherein the bonding is by reaction between oxides on the surface of the silicone or silicone-based material resulting from flame treatment of said surface and isocyanate groups of the polyurethane or polyurethane urea.

\* \* \* \* \*